United States Patent [19]

Cordes, III et al.

[11] 4,076,688

[45] Feb. 28, 1978

[54] POLYCARBONATE STABILIZERS

[75] Inventors: William F. Cordes, III, East Brunswick; Robert E. Diehl, Trenton, both of N.J.

[73] Assignee: American Cyanamid Company, Stamford, Conn.

[21] Appl. No.: 615,872

[22] Filed: Sep. 22, 1975

[51] Int. Cl.² .......................... C08J 3/20; C08K 5/16
[52] U.S. Cl. ........................ 260/45.9 QA; 260/465 E
[58] Field of Search .................. 260/45.9 QA, 465 E

[56] References Cited

U.S. PATENT DOCUMENTS

| 3,079,366 | 2/1963 | Boyle et al. | 260/45.85 A |
| 3,336,357 | 8/1967 | Strokel et al. | 260/465 |
| 3,551,573 | 12/1970 | Baker et al. | 260/465 |

*Primary Examiner*—V.P. Hoke
*Attorney, Agent, or Firm*—Philip Mintz

[57] ABSTRACT

Polycarbonate is effectively stabilized against degradation by ultraviolet radiation by α-cyano-β-(N-cyanoethyl-p-methoxyanilino)acrylonitrile or α-cyano-β-(N-methyl-p-ethoxyanilino)acrylonitrile.

7 Claims, No Drawings

POLYCARBONATE STABILIZERS

This invention relates to certain novel compounds and to their use to stabilize polycarbonates against degradation on exposure to ultraviolet radiation. More particularly, it relates to two specific novel compounds within the genera disclosed by Boyle et al. in U.S. Pat. No. 3,079,366, which two specific compounds are unexpectedly superior for such use when compared with the specific compound disclosed by Boyle et al. which is structurally most similar thereto.

Polycarbonates can be formed into useful articles, such as pipe, hollow objects (e.g. bottles, tumblers, etc.), film, sheet, lenses, hard hats, etc. by such process as injection molding, extrusion, blow-molding, etc. Because of their desirable properties and ease of forming into useful articles, polycarbonates have attained wide commercial utilization. In some of these uses, the polycarbonate is exposed to ultraviolet radiation, such as in sunlight. As is well known, such exposure causes degradation of the polycarbonate, leading to discoloration and embrittlement. It is an object of this invention to provide novel compounds useful, when incorporated in polycarbonates, for inhibiting degradation caused by ultraviolet radiation.

In accordance with the present invention, it has been found that α-cyano-β-(N-cyanoethyl-p-methoxyanilino)acrylonitrile having the formula:

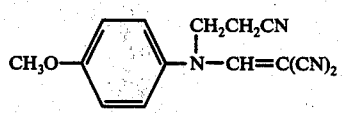

and that α-cyano-β-(N-methyl-p-ethoxyanilino)acrylonitrile having the formula:

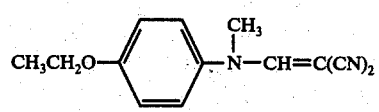

are each effective for inhibiting degradation of polycarbonate on exposure to ultraviolet radiation.

These compounds may be incorporated into polycarbonate by any of the standard techniques, including milling, screw extruding, Banbury mixing, swelling, etc. These compounds are effective over a wide concentration range of about 0.1 to about 5.0 percent based on weight of polycarbonate. Preferably, they are used at a concentration of about 0.5 to about 2.0 percent on weight of polycarbonate. Other additives, such as dyes, foaming agents, pigments, plasticizers, thermal stabilizers, etc. may also be added to the polycarbonate for their usual functions.

This invention is further illustrated in the following examples, wherein all parts are by weight unless otherwise stated.

EXAMPLE 1

A mixture of 35.2 grams (0.2 mole) of N-cyanoethyl-p-methoxyaniline, 29.6 grams (0.2 mole) of triethyl orthoformate, and 13.2 grams (0.2 mole) of malononitrile was heated to 160° C. over a period of 30 minutes and then heated at 165° C. for an additional 30 minutes. The resulting solution was cooled to room temperature and 100 milliliters of ethanol was added thereto. Further cooling of the resulting solution in dry ice caused an oil to separate. After separating the oil from the remainder of the material, methanol was added to the oil causing it to crystallize. The crude product (5.5 grams, melting point 164°–165° C.) was recrystallized from a mixture of 125 milliliters of methanol and 25 milliliters of methyl cellosolve to obtain 3 grams of product melting at 174°–175° C. This latter product was recrystallized from 50 milliliters of ethyl acetate to obtain the desired α-cyano-β-(N-cyanoethyl-p-methoxyanilino)acrylonitrile (Formula I, supra), melting at 175°–177° C.

EXAMPLE 2

A mixture of 62.5 grams (0.5 mole) of N-methyl-p-aminophenol, 74.0 grams (0.5 mole) of triethyl orthoformate, and 33.5 grams (0.5 mole) of malononitrile in 400 milliliters of 99.5% ethanol was prepared under a nitrogen atmosphere and heated at 75°–78° C. for 17 hours. The reaction mixture was cooled to room temperature, diluted with 1.5 liters of water plus ice and allowed to stand ½ hour. The precipitate was filtered to obtain 44 grams of α-cyano-β-(N-methyl-p-hydroxyanilino)acrylonitrile, melting point 187°–189° C. Five grams of this precipitate was treated with diethylsulfate in aqueous sodium hydroxide to obtain 0.5 gram of α-cyano-β-(N-methyl-p-ethoxyanilino)acrylonitrile (Formula II, supra) as a solid which melts at 147°–148° C. after recrystallization from ethyl acetate.

EXAMPLE 3

Test films were prepared by adding the stabilizer, identified in the table below, to a 10 percent solution of water-free unstabilized polycarbonate in chloroform, casting, and drying at 20°–25° C. to obtain films 1 mil thick. The quantity of stabilizer added was 1 percent on weight of polycarbonate. The films were exposed to ultraviolet light in an Atlas Xenon Weather-Ometer (no water spray in the Weather-Ometer) until they became embrittled to the point of complete destruction. The efficiency of the stabilizers in preventing degradation is measured in terms of the time in hours to failure of the film over a control sample which contains no stabilizer. The results were as follows:

| Test | Stabilizer* | Increase in Hours to Failure Over Control |
| --- | --- | --- |
| A | I | 3250** |
| B | II | 2750** |
| C | PA | 1500*** |

Notes:
*Stabilizer I was the compound of Formula I, supra
Stabilizer II was the compound of Formula II, supra
Stabilizer PA was the prior art compound α-cyano-β-(N-methyl-p-methoxyanilino)acrylonitrile of column 5, lines 71–74 of Boyle et al. U.S. Pat. 3,079,366.
**Average of two tests
***Single test These data show that the compounds of the present invention are about twice as effective in prolonging the resistance to ultraviolet radiation of polycarbonate when compared to the prior art compound of closest structural similarity.

We claim:

1. Polycarbonate stabilized against the deteriorating effects of ultraviolet radiation by an effective amount of a stabilizer which is α-cyano-β-(N-cyanoethyl-p-methoxyanilino)acrylonitrile or α-cyano-β-(N-methyl-p-ethoxyanilino)acrylonitrile.

2. A composition as defined in claim 1 wherein said stabilizer is present in an amount of 0.1 to 5.0 percent on weight of polycarbonate.

3. A composition as defined in claim 1 wherein said stabilizer is α-cyano-β-(N-cyanoethyl-p-methoxyanilino)acrylonitrile.

4. A composition as defined in claim 1 wherein said stabilizer is α-cyano-β-(N-methyl-p-ethoxyanilino)acrylonitrile.

5. A compound selected from the group consisting of α-cyano-β-(N-cyanoethyl-p-methoxyanilino)acrylonitrile and α-cyano-β-(N-methyl-p-ethoxyanilino)acrylonitrile.

6. A compound according to claim 5 which is α-cyano-β-(N-cyanoethyl-p-methoxyanilino)acrylonitrile.

7. A compound according to claim 5 which is α-cyano-β-(N-methyl-p-ethoxyanilino)acrylonitrile.

* * * * *